United States Patent
Pfadler et al.

(10) Patent No.: US 11,166,173 B2
(45) Date of Patent: Nov. 2, 2021

(54) METHOD FOR PERFORMING A WIRELESS COMMUNICATION, MOBILE STATION, TRANSPORTATION VEHICLE AND BASE STATION

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: Volkswagen Aktiengesellschaft

( * ) Notice: Subject to any disclaimer, the term of this patent is extended or adjusted under 35 U.S.C. 154(b) by 23 days.

(21) Appl. No.: 16/792,623

(22) Filed: Feb. 17, 2020

(65) Prior Publication Data

US 2020/0267572 A1 Aug. 20, 2020

(30) Foreign Application Priority Data

Feb. 20, 2019 (EP) ..................................... 19158380

(51) Int. Cl.
*H04W 16/28* (2009.01)
*H04B 17/373* (2015.01)
(Continued)

(52) U.S. Cl.
CPC .......... *H04W 16/28* (2013.01); *H04B 7/0413* (2013.01); *H04B 7/0626* (2013.01);
(Continued)

(58) Field of Classification Search
CPC ......... H04W 16/28; H04W 4/40; H04W 4/46; H04W 4/44; H04W 4/02; H04W 24/06;
(Continued)

(56) References Cited

U.S. PATENT DOCUMENTS

| | | |
|---|---|---|
| 2011/0059735 A1 | 3/2011 | Thiel et al. |
| 2011/0064152 A1 | 3/2011 | Okino |
| 2014/0213241 A1 | 7/2014 | Altintas et al. |
| 2016/0128075 A1 | 5/2016 | Kremo et al. |
| 2016/0380685 A1* | 12/2016 | Kasher ................... H04W 8/22 370/329 |

(Continued)

FOREIGN PATENT DOCUMENTS

WO 2018182706 A1 10/2018

OTHER PUBLICATIONS

Huawei et al.; Sidelink Physical Layer Procedures for NR V2X; 3GPP TSG RAN WG1; Meeting #95; Nov. 12-16, 2018; Spokane, Washington.

*Primary Examiner* — Harry H Kim
(74) *Attorney, Agent, or Firm* — Barnes & Thornburg LLP (57) ABSTRACT

A method for performing a wireless communication between a mobile station and a partner station including transmitting a radiation pattern of a first mobile station to the partner station, calculating in the partner station an Antenna radiation pattern Independent Channel Representation (AICR) for the communication between the first mobile station and the partner station thereby eliminating the influence of the received radiation pattern, transmitting the set of AICR representation to the second mobile station and performing the communication between the second mobile station and the partner station with a channel quality prediction based on the received AICR representation between the first mobile station and the partner station. A corresponding mobile station, a corresponding transportation vehicle and a base station.

12 Claims, 6 Drawing Sheets

(51) Int. Cl.
   *H04W 4/40*      (2018.01)
   *H04B 7/0413*    (2017.01)
   *H04B 7/06*      (2006.01)
   *H04B 7/08*      (2006.01)
   *H04L 1/00*      (2006.01)
   *H04W 4/46*      (2018.01)
   *H04W 4/44*      (2018.01)
   *H04W 4/02*      (2018.01)
   *H04W 24/06*     (2009.01)
   *H04B 17/309*    (2015.01)

(52) U.S. Cl.
   CPC ........... *H04B 7/086* (2013.01); *H04B 17/373* (2015.01); *H04L 1/0026* (2013.01); *H04W 4/40* (2018.02)

(58) Field of Classification Search
   CPC .. H04B 17/373; H04B 7/0413; H04B 7/0626; H04B 7/086; H04L 1/0026
   See application file for complete search history.

(56) References Cited

U.S. PATENT DOCUMENTS

| | | |
|---|---|---|
| 2017/0048156 A1   | 2/2017  | Simsek |
| 2017/0223733 A1   | 8/2017  | Nakata |
| 2018/0084555 A1*  | 3/2018  | Mori ........................ H04B 7/00 |
| 2018/0184272 A1   | 6/2018  | Hehn et al. |
| 2020/0015170 A1*  | 1/2020  | Krishnamachari ... H04W 52/42 |
| 2020/0077279 A1*  | 3/2020  | Foerster .................... G01S 7/02 |
| 2020/0145799 A1*  | 5/2020  | Baghel .................. H04L 1/0018 |

\* cited by examiner

METHOD FOR PERFORMING A WIRELESS COMMUNICATION, MOBILE STATION, TRANSPORTATION VEHICLE AND BASE STATION

PRIORITY CLAIM

This patent application claims priority to European Patent Application No. 19158380.6, filed 20 Feb. 2019, the disclosure of which is incorporated herein by reference in its entirety.

SUMMARY

Illustrative embodiments relate to a method for performing a wireless communication between a second or third mobile station and a partner station. Disclosed embodiments also disclose a corresponding mobile station, a transportation vehicle and a corresponding base station.

BRIEF DESCRIPTION OF THE DRAWINGS

Exemplary embodiments are shown in the drawing and are explained in greater detail in the following description. In the drawings.

DETAILED DESCRIPTION

For the scenario of transportation vehicles equipped with wireless communication modules that provide connectivity to public communication networks but also provide a direct communication capability for exchanging information among the road participants, wireless communication offers the opportunity to implement a wide range of applications. A lot of research concerns the fields of cooperative and autonomous driving. Direct communication between transportation vehicles is often referred to be Vehicle-to-Vehicle (V2V) communication. Also possible is communication from and to a transportation vehicle with infrastructure communication stations such as a Road Side Unit (RSU). Such type of communication is very often referred to be Vehicle-to-everything (V2X) communication. This covers different types of transportation vehicle communications such as V2V, Vehicle-to-Infrastructure (V2I), Vehicle-to-Internet-based Networks (V2N) and even Vehicle-to-Pedestrians (V2P), etc. When V2X communication is supported with cellular communication methods or mechanisms, like LTE or 5G mobile communication it is referred to be c-V2X communication.

Predictive Quality of Service (QoS) for radio communication estimates and is using the prediction of radio channel properties, e.g., the channel load on a system level, or the channel coefficients on the radio channel level. Therefore, a transportation vehicle measures its radio channel (link) for a specific geographical location. The information about the measured radio link is shared with other users to predict their communication quality for this geographical location in the future.

Typical communication scenarios for V2V communication are road safety scenarios, traffic efficiency scenarios and infotainment scenarios. From the road safety scenarios the following examples are currently being deployed: "Cooperative Forward Collision Warning", "Pre-Crash-Detection/Warning", "Lane change warning/blind spot warning", "Emergency Electric Brake Light Warning", "Intersection Movement Assist", "Emergency Vehicle Approaching", "Road Works Warning" (non-exhaustive list). From the traffic efficiency scenarios the "High-Density Platooning" is mentioned. The high density platooning application could also be regarded to be an example of the road safety scenarios, because the cooperative driving of a plurality of transportation vehicles in a convoy with small distance (<10 m) is very critical in terms of the safety requirements.

For the V2V or V2X communication, the following technologies are available. LTE-based and 5G-based cellular V2X (C-V2X) with sidelink communication at the physical layer, also called PC5 sidelink communication, and WLAN p communication (IEEE 802.11p).

Autonomous driving is on the rise. Though it has been demonstrated that autonomous transportation vehicles can rely on their own sensors for environmental scanning, it is foreseen that they can greatly benefit from cooperation with surrounding transportation vehicles, either in terms of control or in terms of perception. This cooperation is supported by V2V or in general V2X communication.

From US 2017/0048156 A1 a method for estimating the probability that a data packet, wirelessly transmitted from a transmitter, which is a traffic infrastructure object or a transportation vehicle to a receiver will be received. The method includes estimating a signal quality of the data packet and estimating the probability that the data packet will be received based on the estimated signal quality.

US 2017/0223733 A1 a mobile communication system and apparatus is known. The mobile communication system includes a propagation path characteristic acquirer section and a resource selector section. The propagation path characteristics acquirer section acquires propagation path characteristics information in association with a future communication position. The propagation path characteristics information being about propagation path characteristics between (i) the target communication apparatus and (ii) a reference antenna. The resource selector section, based on the propagation path characteristics information, selects a resource to be used in communication at the future communication position before the selected resource antenna of the mobile communication apparatus comes to be placed at the future communication position.

From US 2011/0064152 A1 a channel information prediction system and a channel information prediction method is known in which channel information and a transformation matrix are used to calculate a prediction value of the channel information in a multi-antenna transmission system.

In these and other current approaches, the radiation pattern of the antennas is assumed to be equal for the transportation vehicles; hence an error in the prediction of the channel coefficients occur. The 3D radiation pattern and thus the attenuation of the electro-magnetic waves in amplitude and phase, strongly depends on the geometry of the transportation vehicle and the type of the antenna arrangement. Disclosed embodiments improve the accuracy of channel prediction to optimize the reliability of V2V and V2X communication.

Disclosed embodiments provide a method for performing a wireless communication, a corresponding mobile station for performing the method, a transportation vehicle and a corresponding base station.

With the a priori knowledge of the radiation pattern of the transmitter and receiver antenna the channel representation (e.g., as channel coefficients) can be calculated independently of the antenna characteristics of both antenna arrangements. The radiation pattern independent channel coefficient can be used for different transmitter and receiver antennas at the same location to predict their channel coefficient.

The idea is that the transportation vehicles are transmitting their own radiation pattern plus the geographical position in a Shared Radiation Pattern Message (SRPM), hereinafter called SRPM message. A succeeding transportation vehicle or a base station which knows its own radiation pattern is then able to calculate a channel representation independent of the radiation pattern of the transmitting transportation vehicle. It can be assumed that the manufacturer knows the radiation pattern for each of the manufactured transportation vehicle models. The manufacturer computes the radiation pattern with simulation algorithms or measures it and provides it in memory. The information about the channel representation without the antenna pattern can be shared. Likewise, the manufacturer of a base station can do the same such that also the base station radiation pattern is known.

In general, the parameters of the SRPM message may include the geographical position, the own radiation pattern and a channel representation without the antenna influence if such channel representation is already known, e.g., from a previous calculation.

A receiver, knowing the radiation patterns of the communication partner, can deduce a channel representation free of the influence of the antenna arrangement and the transportation vehicle geometry.

A disclosed embodiment relates to a method for performing a wireless communication between a second mobile station and a partner station, comprising transmitting a radiation pattern of a first mobile station to the partner station, calculating in the partner station an Antenna Independent Channel Representation (AICR) for the communication between the first mobile station and the partner station thereby eliminating the influence of the received radiation pattern, transmitting the antenna independent channel representation to the second mobile station and performing the estimation of the channel properties between the second mobile station and the partner station based on the AICR representation between the first mobile station and the partner station. The radiation pattern of the first mobile station should be known in the first mobile station. Likewise, the radiation pattern of the partner station should be known to the partner station. This proposal allows to predict channel properties in a succeeding mobile station for a future communication with the partner station with greater accuracy such that the future communication is more reliable.

The proposal is very beneficial for the application to V2V and V2X communication, wherein the first mobile station and second mobile station correspond to transportation vehicles equipped with a communication module moving on a road, place or ground, wherein the communication module is adapted for performing wireless communication, and wherein the position of the second mobile station at the time when performing the communication between the second mobile station and the partner station corresponds to the position at the time when the first mobile station was transmitting the radiation pattern to the partner station.

The proposal is very beneficial for C-V2X communication where the communication module is adapted for a communication according to a cellular mobile communication system where the partner station corresponds to a base station of the cellular mobile communication system. The base station is better suited for executing the advanced calculation of the radiation pattern independent channel representation. This way, only the base stations need to be equipped with such sort of powerful computing units.

In another disclosed embodiment the proposal concerns a method for performing a wireless communication between a third mobile station and a partner station, comprising transmitting a radiation pattern of a first mobile station to the partner station, calculating in the partner station an AICR for the communication between the first mobile station and the partner station thereby eliminating the influence of the received radiation pattern, transmitting the AICR representation to the third mobile station and performing the communication between the third mobile station and the partner station based on the AICR representation between the first mobile station and the partner station. Again this operation may include performing the estimation of the channel properties between the second mobile station and the partner station based on the AICR representation between the first mobile station and the partner station. In other words, this is equivalent to the prediction of the channel quality and the corresponding adjustment of the transmission parameters.

In such an exemplary embodiment, it is beneficial when the first and third mobile stations plus the partner station correspond to transportation vehicles equipped with a communication module moving on a road, place or ground, wherein the communication module is adapted for a wireless communication according to a V2X communication system, wherein the position of the third mobile station at the time when performing the communication between the third mobile station and the partner station corresponds to the position of the partner station at the time when the first mobile station was transmitting the radiation pattern to the partner station and wherein the partner station corresponds to the second mobile station.

In at least one disclosed embodiment the first mobile station transmits the radiation pattern in a shared radiation pattern message wherein the radiation pattern message includes the known radiation pattern of the first mobile station and one or more of the following information items, the current position in space and time of the first mobile station and the AICR representation for the communication between the second or third mobile station and the partner station.

For the calculation of the radiation pattern independent channel representation for the communication between the second or third mobile station and the partner station it is beneficial to include multiplying the inverse of the received radiation pattern from the first mobile station with the measured transfer function for the communication channel between the second or third mobile station and the partner station. This way the influence of the radiation pattern from the first transportation vehicle can be eliminated.

To eliminate the influence of the radiation pattern from the base station, it is beneficial that calculating in the partner station the AICR representation for the communication between the second or third mobile station and the partner station further includes multiplying the inverse of the radiation pattern of the partner station with the result of the calculation operation of multiplying the inverse of the received radiation pattern from the first mobile station with the measured transfer function for the communication channel between the second or third mobile station and the partner station.

In a mathematical expression it is beneficial for at least one disclosed embodiment if the calculation of the radiation pattern independent channel representation $\Sigma_{AICR}$ is performed according to the formula:

$$\Gamma_{AICR} = G_{BS_{known}}(\Theta,\Phi)^{-1} G_{vehicle_{rcvd}}(\Theta,\Phi)^{-1} * \Gamma_{msrd},$$

where $\Theta, \Phi$ correspond to the spherical coordinates;

$G_{BS_{known}}$ corresponds to the radiation pattern from the base station (210)

$G_{vehicle_{rcvd}}$ corresponds to the received radiation pattern from the first mobile station; and $\Gamma_{msrd}$ corresponds to the measured transfer function for the communication between the first mobile station and the base station measured at the base station.

Likewise for the other disclosed embodiment it is beneficial, wherein the calculation of the AICR representation $\Gamma_{AICR}$ is performed according to the formula:

$$\Gamma_{AICR} = G_{V_{known}}(\Theta,\Phi)^{-1} G_{V_{rcvd}}(\Theta,\Phi)^{-1} * \Gamma_{msrd}$$

where $\Theta, \Phi$ correspond to the spherical coordinates;

$G_{V_{known}}$ corresponds to the radiation pattern from the second mobile station $G_{vehicle_{rcvd}}$ corresponds to the received radiation pattern from the first mobile station; and $\Gamma_{msrd}$ corresponds to the measured transfer function for the communication between the first mobile station and the second mobile station measured at the second mobile station. The above presented formulas are valid for the situation where the two communication partners are communicating in an idealistic surrounding with no obstacles causing reflections in-between. For more realistic transmission situations the mathematical description is far more complex.

For a mobile station adapted for the use in the method according to a first disclosed embodiment, it is beneficial that it comprises a wireless communication module for transmitting messages to a partner station, wherein the wireless communication module is adapted to transmit a radiation pattern of the mobile station to the partner station in a SRPM message.

In an exemplary embodiment it is beneficial that the communication module is adapted to receive an SRPM message from a first mobile station, and further comprises a procession unit, the processing unit being adapted for calculating an AICR representation for the communication between a second or third mobile station and the partner station and wherein the communication module is adapted to transmit the AICR representation to the third mobile station.

In a still further disclosed embodiment the wireless communication module is adapted for transmitting a message to the partner station, corresponding to a channel quality prediction based on the received radiation pattern independent channel representation.

For safety critical cooperative or autonomous driving applications, it is beneficial to equip a transportation vehicle with such kind of apparatus of a mobile station.

Likewise it is beneficial to adapt a base station for a cellular mobile communication system for the use in the method by comprising communication methods or mechanisms for transmitting messages to a mobile station, the communication methods or mechanisms being adapted to receive a radiation pattern of a first mobile station, further comprising a procession unit, the processing unit being adapted for calculating an AICR representation for the communication between the first mobile station and the base station, the communication methods or mechanisms being further adapted to transmit the AICR representation to a second mobile station.

It will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, read only memory (ROM) for storing software, Random Access Memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the manner which the claims call for.

Figure 1:
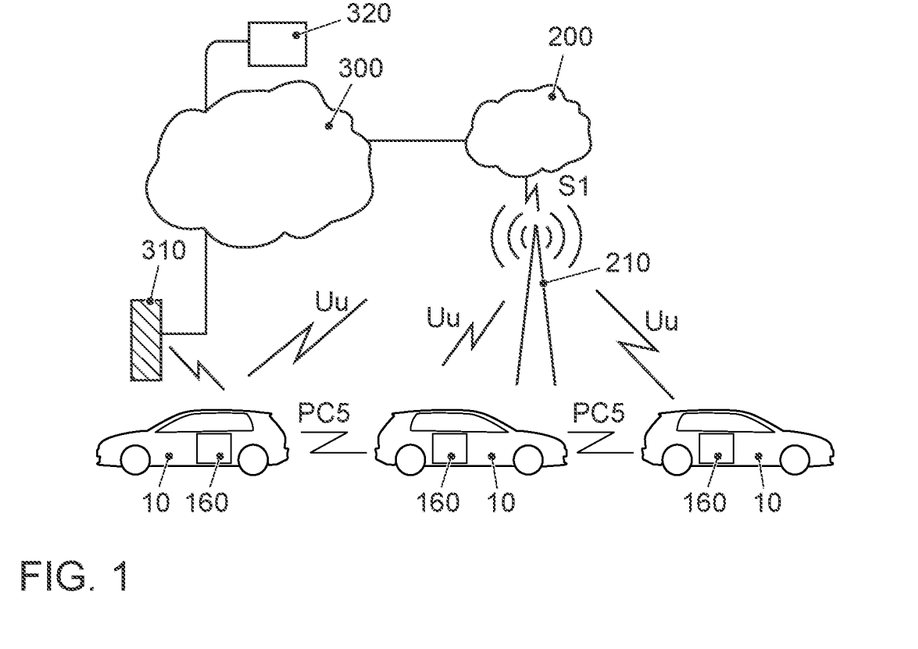
FIG. 1 illustrates the principle architecture of a V2V and V2X communication system.

FIG. 1 shows the system architecture for the proposal. Reference number 10 denotes a mobile station as a transportation vehicle. The depicted mobile station is exemplified as a passenger car. In other examples it may be differently exemplified, e.g., a smart phone, a smart watch, a tablet computer, notebook or laptop computer or the like. The mobile station exemplified as a transportation vehicle may be any type of a vehicle. Examples of other types of vehicles are: buses, motorcycles, commercial vehicles, in particular, trucks, agricultural machinery, construction machinery, rail vehicles, etc. The use of the disclosed embodiments would be generally in land vehicles, rail vehicles, watercrafts and aircrafts possible, in particular, drones, helicopters and air taxis. The transportation vehicle 10 is equipped with an on-board communication module 160 including corresponding antenna such that the transportation vehicle 10 can participate in a form of a mobile communication service. FIG. 1 illustrates that transportation vehicle 10 may transmit and receive signals to and from a base station 210 of a mobile communication service provider.

Such base station 210 may be an eNodeB base station of an LTE (Long Term Evolution) mobile communication service provider. The base station 210 and the corresponding equipment is part of a mobile communication network with a plurality of network cells where each cell is served by one base station 210.

The base station 210 in FIG. 1 is positioned close to a main road on which the transportation vehicle 10 is driving. Of course, other transportation vehicles may also drive on the road. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The cars 10 are equipped with the on-board communication module OBU 160. This OBU corresponds to an LTE or any other communication module with which the transportation vehicle 10 can receive mobile data in downstream direction and can send such data in upstream or in direct device-to-device (D2D) direction. For the application in transportation vehicles and for the implementation of V2V and V2X communication capability primarily the following technologies may be used: LTE C-V2X (3GPP Releases 14 and above) which is based on the PC5 interface (also known as sidelink communication at the physical layer)—corresponding to the 4G and future 5G mobile communication technology; WLAN p, corresponding to the IEEE 802.11p communication technology In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane protocol terminations towards the UE, radio resource control (RRC). The eNodeBs are interconnected with each other by the so-called X2 interface. The eNodeBs are also connected by the so-called S1 interface to the EPC Evolved Packet Core (EPC) 200, more specifically to the Mobility Management Entity (MME) by the S1-MME and to the Serving Gateway (S-GW) by the S1-U interface.

From this general architecture FIG. 1 shows that eNodeB 210 is connected to the EPC 200 via the S1 interface and that EPC 200 is connected to the Internet 300. The backend server 320 to which the transportation vehicles 10 may send messages to and receive messages from is also connected to the Internet 300. In the field of cooperative and autonomous driving, the backend server 320 typically is located in a traffic control center. The S1 interface may be implemented with wireless communication technology such as with the help of microwave radio communication by directional antennas or wired communication technology based on fiber cables. Finally, an infrastructure network component is also shown. This may be exemplified by a road-side unit RSU 310. For the ease of implementation, it is considered that all components have assigned an Internet address, typically as an IPv6 address, such that the packets transporting messages between the components can be routed correspondingly.

The various interfaces of the LTE network architecture are standardized. It is particularly referred to the various LTE specifications, which are publicly available for the sake of sufficiently disclosing further implementation details.

Figure 2:
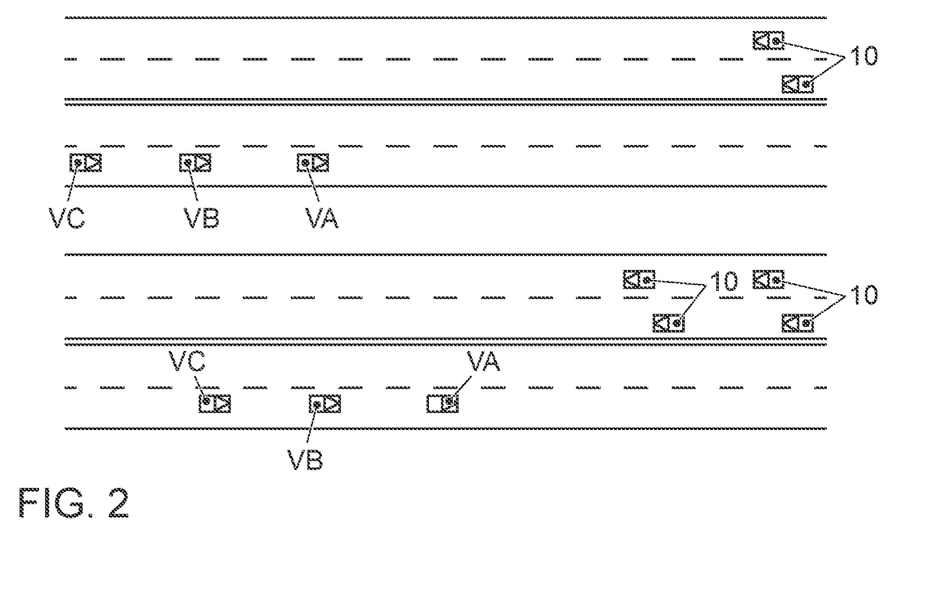
FIG. 2 shows a typical traffic scenario in which a plurality of transportation vehicles drives on a motorway.

FIG. 2 shows a typical traffic scenario when transportation vehicles are driving on a road. Illustrated is a motorway with two lanes in each direction. The drawing depicts the motorway at two different points in time. The top illustration shows three transportation vehicles VA, VB, VC driving one after the other on one lane. Normally, there is a typical distance between the transportation vehicles moving one after the other. The transportation vehicles on the other side of the road are labelled with reference number 10. Since the transportation vehicles VA, VB, VC are moving in one direction, it is seen in the bottom illustration that the transportation vehicles VB and VC will get to positions where the transportation vehicles VA and VB were positioned at the time of the top illustration. The transportation vehicle VB at the position in bottom illustration when communicating with a base station 210 (not shown), therefore will experience very similar transmission conditions as transportation vehicle VA when it was communicating with the base station 210 at the position in the top illustration.

It is therefore an idea that transportation vehicle VB when placed at a position, the transportation vehicle VA was located before, where VA did the channel quality determination, could reuse the results of channel quality determination from transportation vehicle VA for its own channel quality prediction, thereby improving the accuracy for the channel quality prediction.

Figure 3:
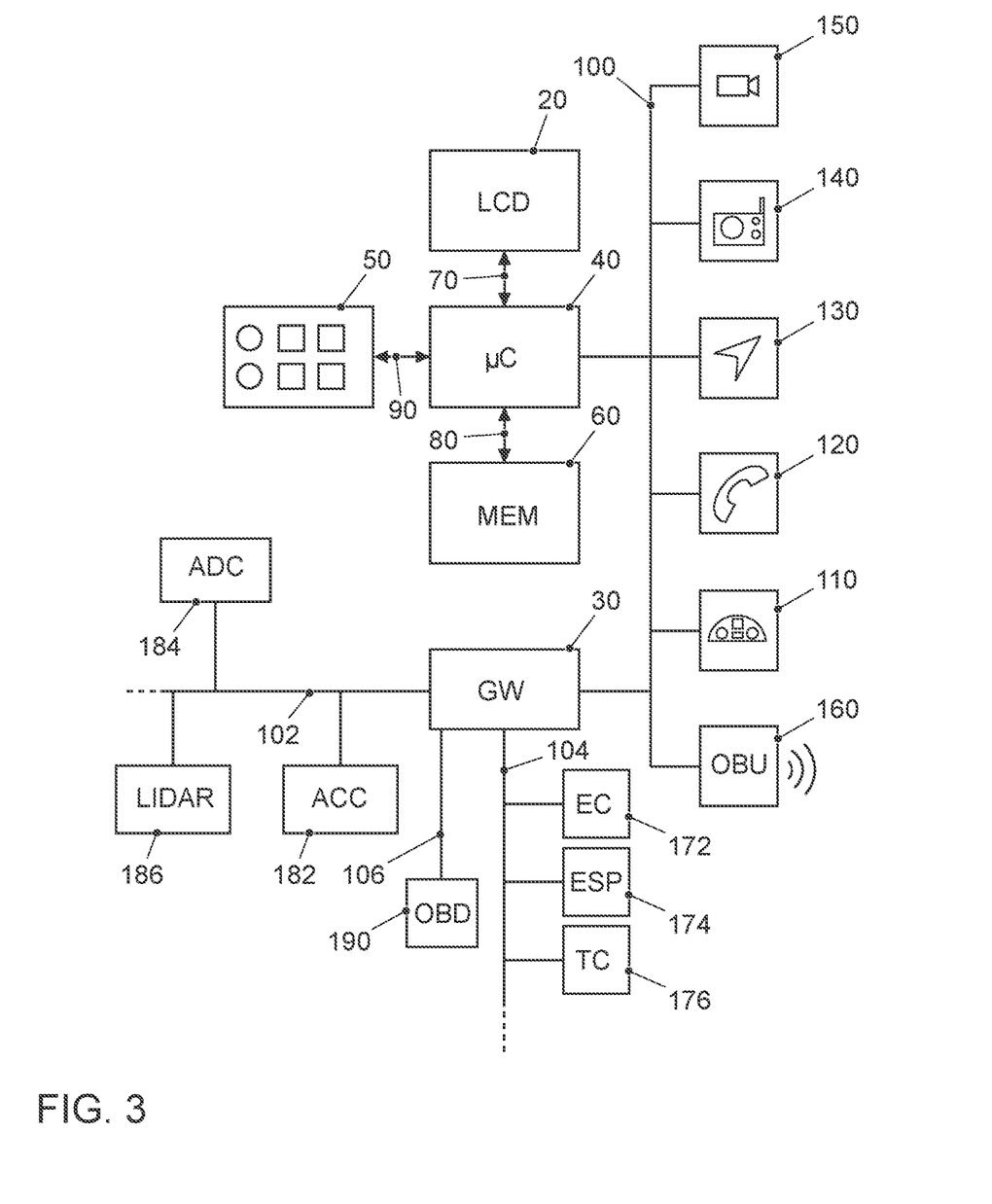
FIG. 3 shows a block diagram of a transportation vehicle's electronics system.

FIG. 3 shows schematically a block diagram of the transportation vehicle's board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 the high-speed option of the CAN bus according to ISO standard 11898-2 may be taken into consideration. Alternatively, for example, the use of an Ethernet-based bus system such as IEEE 802.03cg is another example. Bus systems in which the data transmission via optical fibers happens are also usable. Examples are the Media Oriented System Transport (MOST) Bus or the Domestic Digital Bus (D2B) Bus. For inbound and outbound wireless communication, the transportation vehicle 10 is equipped with the communication module 160 as already explained.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the Controller Area Network (CAN) bus system 104. Since various sensors are installed in the transportation vehicle and these are no longer only connected to individual control units, such sensor data are also distributed via the bus system 104 to the individual control devices.

However, the modern transportation vehicle can also have further components such as further surroundings scanning sensors like a LIght Detection And Ranging (LIDAR) sensor 186 or RAdio Detection And Ranging (RADAR) sensor and more video cameras, e.g., as a front camera, rear camera or side camera. Such sensors are used more and more in transportation vehicles for surroundings observation. Further control devices, such as an automatic driving control unit ADC 184 and an adaptive cruise control unit ACC 182, etc., may be provided in the transportation vehicle. There may be other systems in the transportation vehicle, too such as the UWB transceivers for inter transportation vehicle distance measurement. The UWB transceivers may typically be used for a short distance observation, e.g., 3 to 10 m. The RADAR and LIDAR sensors could be used for scanning a range up to 250 m or 150 m and the cameras cover a range from 30 to 120 m. The components 182 to 186 are connected to another communication bus 102. The Ethernet-Bus may be a choice for this communication bus 102 due to its higher bandwidth for data transport. One Ethernet-Bus adapted to the special needs of car communication is standardized in the IEEE 802.1Q specification. Moreover, further information for surroundings observation may be received via V2V communication from other road participants. Particularly for those road participants not being in Line Of Sight (LOS) to the observing transportation vehicle it is very beneficial to receive the information about their position and motion via V2V communication. Reference number 190 denotes an on-board diagnosis interface.

For the purpose of transmitting the transportation vehicle-relevant sensor data via the communication interface 160 to another transportation vehicle or to a central computer 320, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e., to another transportation vehicle or to central computer 320, the on-board communication unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

The transmission conditions are typically represented by channel coefficients which characterize the transfer function. Since the estimated channel coefficients depend on many parameters, such as position and velocity of the transportation vehicle, sampling rate, used bandwidth, modulation type, etc. it is a high expenditure estimation process. The channel quality however needs to be predicted since V2V and V2X communication is a highly dynamic process already due to the fact that the distance to the communication partner station and the environment is changing all the time when the transportation vehicles are moving. On a road, there are other road participants (transportation vehicles in different categories), traffic signs, traffic lights, buildings at the side of the road, etc. which may have influence on the channel quality which makes the task of channel quality prediction very demanding.

Figure 4:
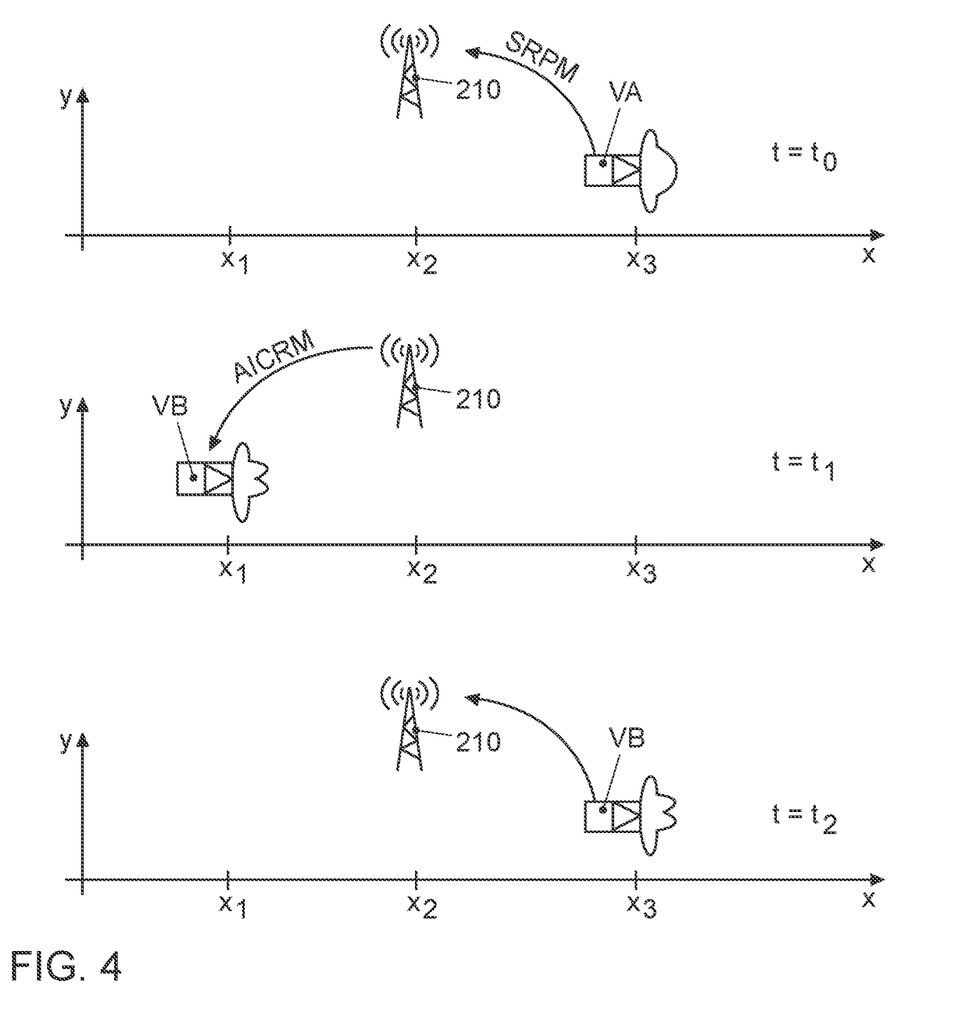
FIG. 4 shows a first disclosed embodiment where a first transportation vehicle and second transportation vehicle communicate to a base station.

FIG. 4 illustrates a first disclosed embodiment of the proposal. Shown is the first car VA of FIG. 3 communicating with base station 210 at position x3 and at time t0. The illustration also illustrates a first type of a radiation pattern for car VA and a second type of radiation pattern for car VB. Since the channel quality is also subjectively influenced by the car's radiation pattern, in this disclosed embodiment the radiation pattern is transferred to the base station 210 in a SRPM message. The message has the following format:

| SRPMH | RP | POSE | CRC |
|---|---|---|---| where
SRPMH corresponds to the message header of the SRPM message,
RP corresponds to the radiation pattern,
POSE corresponds to the information about the current position of car VA and the motion direction and the velocity at which the car is moving, and CRC corresponds to an error correction code.

Once the base station 210 has received the message, it will calculate a radiation pattern independent channel representation, the details of which will be explained later. Since also the professional base station antenna equipment typically consists of a plurality of antenna modules with a certain directivity, also the base station does not have an isotropic radiation pattern. It therefore is beneficial to also eliminate the influence of the base station radiation pattern. The base station 210 would also take into account the known radiation pattern of the base station 210 when calculating the radiation pattern independent channel representation. This radiation pattern independent channel representation will be transmitted from the base station 210 to the succeeding car VB as an Antenna Independent Channel Representation Message (AICRM), hereinafter called AICRM message at time t1. The AICRM has the following format:

| AICRMH | AICR | CRC |
|---|---|---| where
AICRMH corresponds to the message header of the AICRM message,
AICR corresponds to the antenna independent channel representation, hereinafter called AICR representation and
CRC corresponds to an error correction code.

In car VB the received antenna independent channel representation AICR will be used for predicting the channel quality for a planned communication with the base station 210. When the car VB performs the communication at time t2 with t0<t1<t2, where it has the same, or almost the same position x3, it will experience the same or at least similar channel properties as car VA at time t0.

Figure 5:
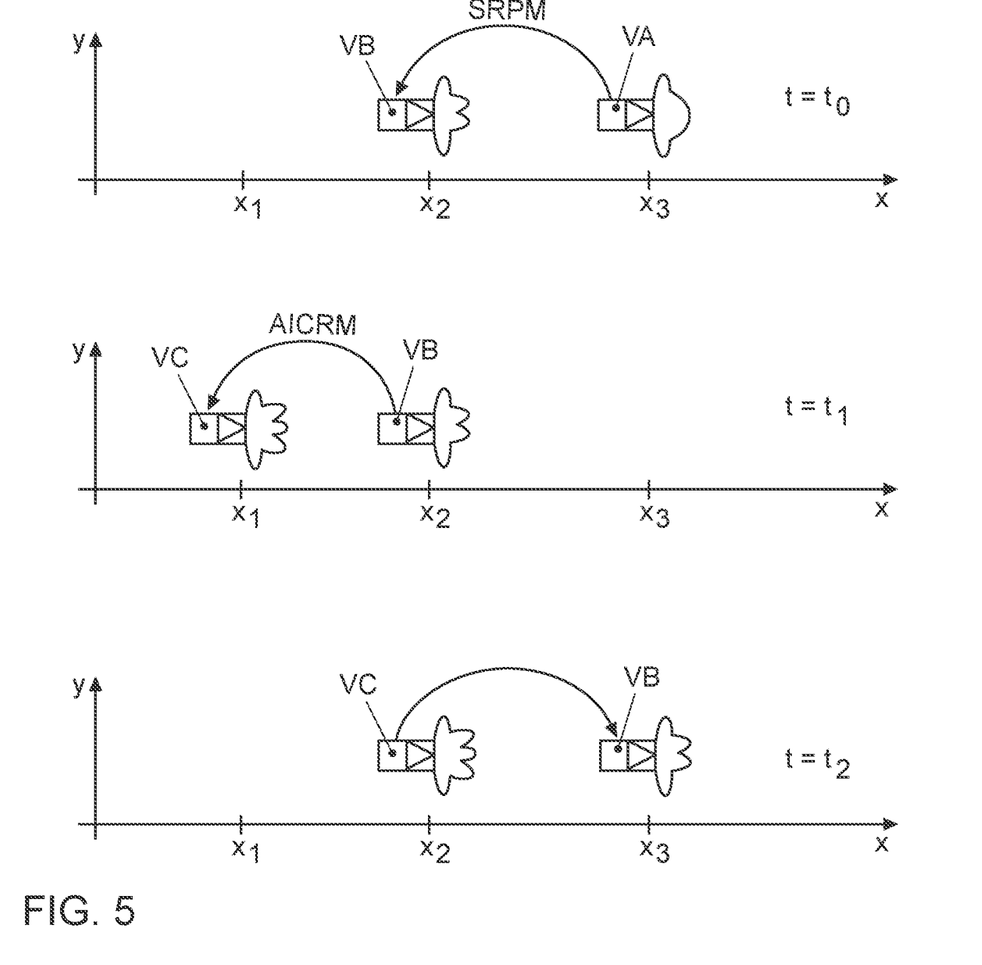
FIG. 5 shows a second disclosed embodiment where three transportation vehicles communicate directly.

FIG. 5 illustrates a second disclosed embodiment of the proposal. The same reference signs denote the same components as in FIG. 4. The difference to the disclosed embodiment of FIG. 4 is that a V2V communication is performed. This may be done based on WLAN p standard with no involvement of a base station. The problem with the prediction of the channel quality also exists in this V2V communication mode. A solution to this problem is very similar to the disclosed embodiment depicted in FIG. 4. The first car VA at position x3 at time t0 transmits its radiation pattern to the succeeding car VB in a shared radiation pattern message SRPM. The calculation of an AICR representation will be performed in car VB. In this calculation, the influence on the channel quality of the radiation pattern of car VB will also be eliminated. In this disclosed embodiment this is even more needed than in the first disclosed embodiment. The geometry of the car and the antenna design differ much more from car model to car model such that the influence is greater than the influence of the radiation pattern of the base station. The third car VC when receiving the AICR representation at time t1 will use it for channel quality prediction for future V2V communication to car VB. When car VC performs a V2V communication at time t2 with its own individual radiation pattern it has the same or a similar position x2 as the position of car VB at time t1. The distance between cars VB and VC is the same or similar to the distance between cars VB and VA at time t0.

Figure 6:
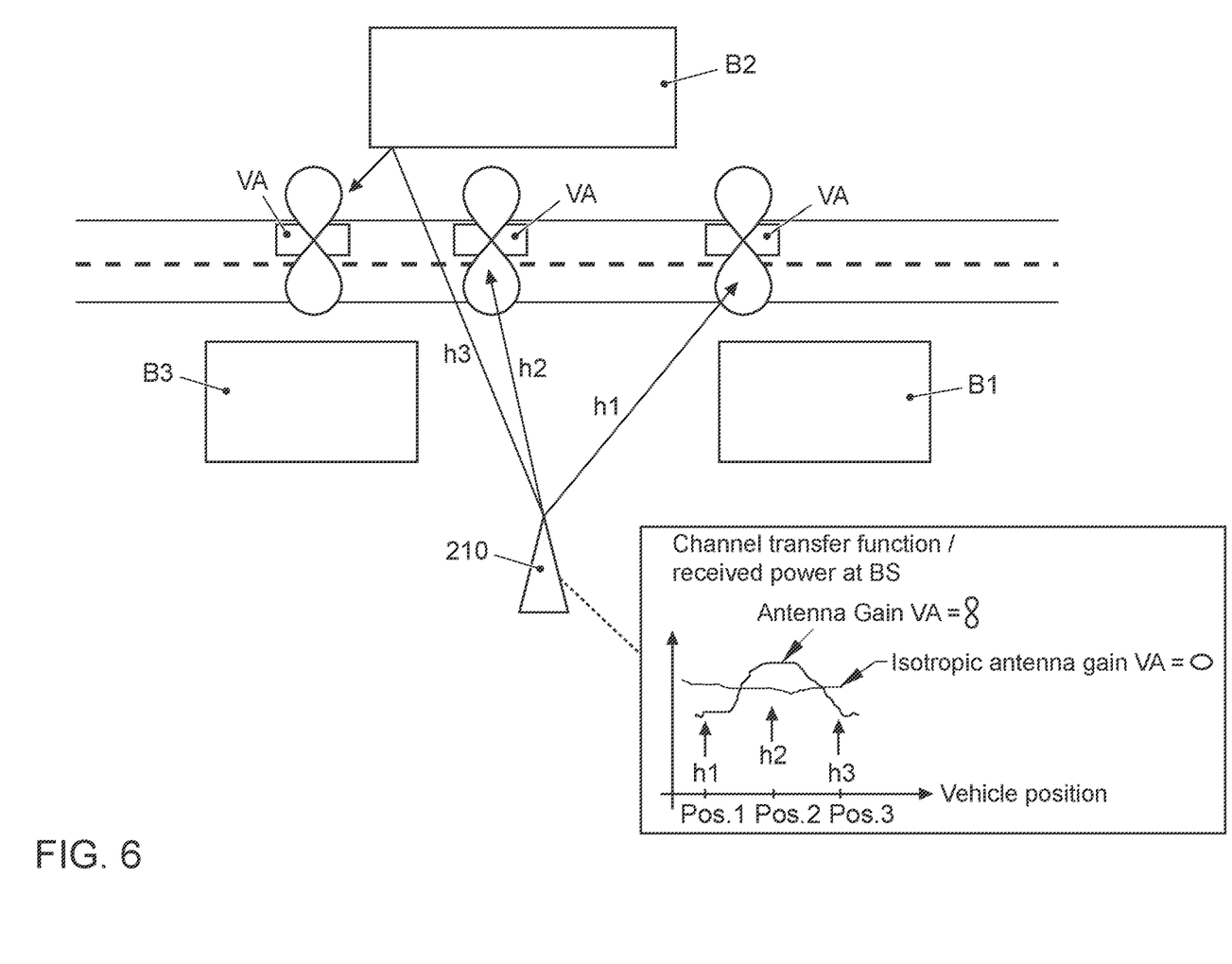
FIG. 6 shows a more detailed illustration for the first disclosed embodiment for a first type of a transportation vehicle.
Figure 7:
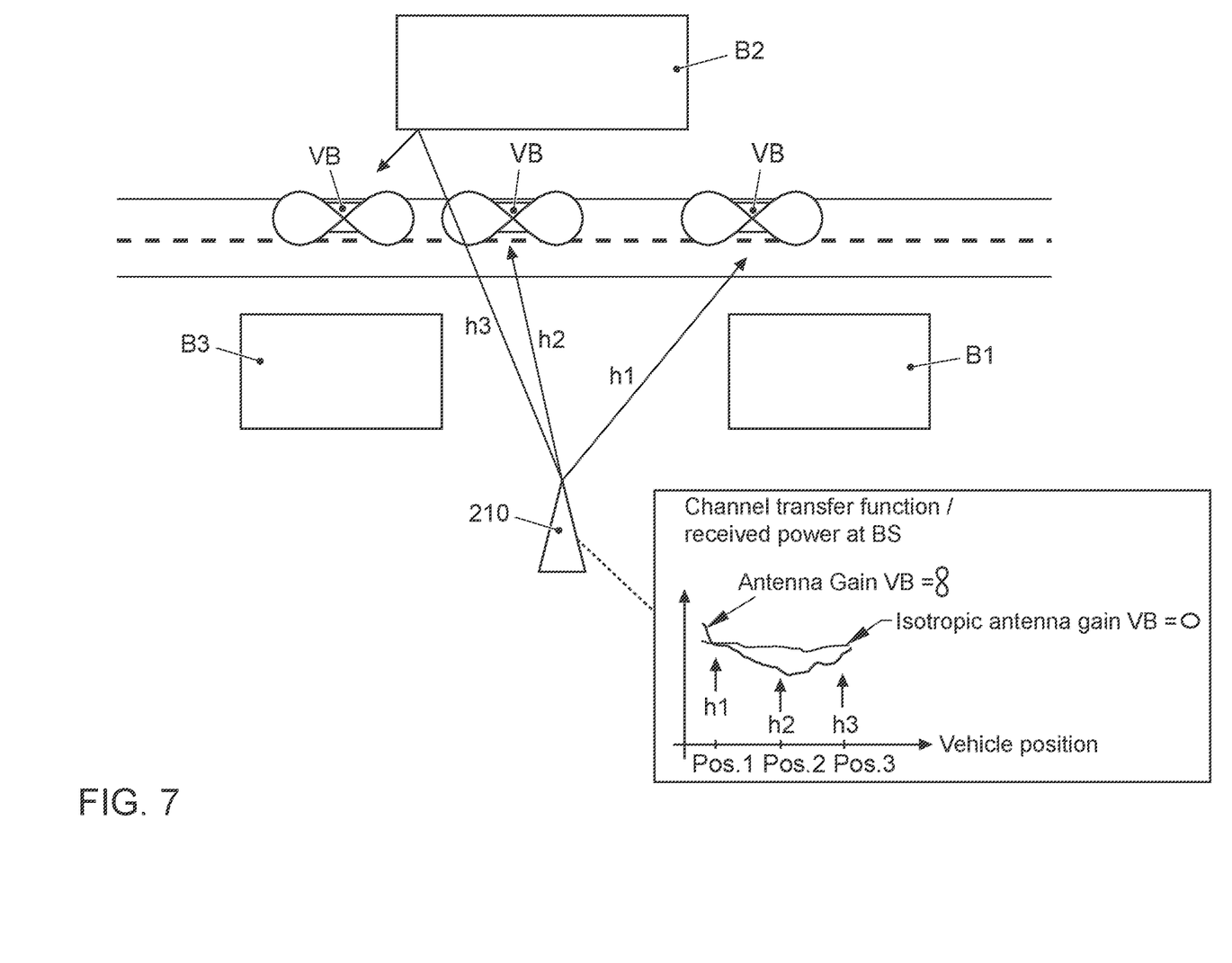
FIG. 7 shows a more detailed illustration for the first disclosed embodiment for a second type of a transportation vehicle.

FIGS. 6 and 7 show more details to the problem of channel quality prediction. Again, the same reference signs denote the same components as FIG. 4 and FIG. 6 shows the same car VA, driving on one lane located at three different positions. The radiation pattern of car VA is depicted with lobes in vertical direction. The position of the base station 210 is also depicted. In addition, FIG. 6 shows that different buildings B1 to B3 are distributed along the road. When car VA is in positions Pos. 2, and 3, the car is in LOS to the base station 210 at different distances. When car VA is in position Pos.1, the car is not in line of sight (NLOS) to the base station 210 but the signal from base station 210 reaches car VA via a reflection at the building B2. In base station 210 the received signal strength will be measured for the different positions when the cars VA and VB are moving. A measured signal strength curve is illustrated in the separate window of FIG. 6 for car VA and in the separate window of FIG. 7 for car VB. The curves showing the measurement results are labelled antenna gain VA and antenna gain VB. Since the radiation patterns are different for the cars VA and VB, illustrated by the vertical direction of the depicted side lobes in FIG. 6 and the horizontal side lobes in FIG. 7, the measured curves are quite different. The base station 210, after having received the radiation pattern from the corresponding car VA, VB, calculates the antenna independent channel representation AICR. The corresponding antenna independent channel representations are also illustrated in FIGS. 6 and 7 and labelled isotropic antenna gain VA and VB.

The following mathematical description considers a simplified free space model and provides the equations for calculating the AICR representation.

The mathematics for the simplified free space model is provided in the text book of Constantine, A. Balanis. "Antenna theory: analysis and design." MICROSTRIP ANTENNAS, third edition, John Wiley & Sons (2005).

The directivity $D(\Theta, \Phi)$ of an antenna can be calculated by the formula:

$$D(\Theta, \Phi) = 4\pi \frac{F(\Theta, \Phi)}{\int_0^{2\pi} \int_0^{\pi} F(\Theta, \Phi) \sin\Theta \, d\Theta d\Phi},$$

where $\Theta$, $\Phi$ are spherical coordinates for azimuth and elevation angles in which the antenna is radiating power, $F(\Theta, \Phi)$ corresponds to the radiation intensity for the different directions.

The gain G of an antenna is given by the formula:

$G(\Theta,\Phi) = e_{cd} D(\Theta,\Phi)$, where $e_{cd}$ corresponds to the antenna radiation efficiency.

The Friis transmission equation explains the relationship between the receive and transmit power and also shows the impact of the 3D antenna gain:

$$\Gamma = \frac{P_r}{P_t} = (PLF) * G_t(\Theta, \Phi) G_r(\Theta, \Phi) \left(\frac{\lambda}{4\pi R}\right)^2,$$

where R corresponds to the distance between transmitter station Tx and receiver station Rx [m].

PLF corresponds to a polarization loss factor, and $\lambda$ corresponds to the wavelength [m] of the radiated signal.

The channel transfer function can be expressed as follows:

$$h_{i,j}(\vec{r}) = \Gamma(\vec{r}) e^{-\frac{2\pi j \vec{r}}{\lambda}},$$

where $\vec{r}$ corresponds to the traveled path [m] the signal has taken.

The channel matrix H is given by summing up all propagation paths from the ith transmitter to jth receiver, where $$H = \sum_{i,j=1} h_{i,j}$$

For a simple Single Input Single Output (SISO) communication case we obtain H as scalar. H is obtained as a 4×4 channel matrix for a Multiple Input Multiple Output (MIMO) communication, when antenna arrangements with two transmit antennas and two receive antennas (radio links) exist.

Example of a SISO communication between a base station 210 and a transportation vehicle antenna. The base station 210 is receiving the antenna characteristic like the antenna gain $G_{vehicle}(\Theta, \Phi)$ the exact position, future path and speed of the transportation vehicle antenna. The base station 210 is able to calculate the channel transfer function for an isotropic antenna gain $G_{isotropic}(\Theta, \Phi)=1$ by multiplying the inverse of the known transportation vehicle antenna gain with transfer function.

$G(\Theta,\Phi)^{-1} * G(\Theta,\Phi) = G_{isotropic}(\Theta,\Phi)=1$

By multiplying the inverse of the known base station 210 and transportation vehicle antenna gain with the measured channel transfer function the AICR may be obtained by the following formula:

$\Gamma_{AICR} = G_{BS_{known}}(\Theta, \Phi)^{-1} G_{vehicle_{known}}(\Theta, \Phi)^{-1} * \Gamma$, corresponding to $\Gamma_{AICR} = G_{BS_{known}}(\Theta, \Phi)^{-1} G_{vehicle_{known}}(\Theta, \Phi)^{-1} * (PLF) * G_{BS_{measured}}(\Theta, \Phi) *$ $G_{vehicle_{measured}}(\Theta, \Phi) * \left(\frac{\lambda}{4\pi R}\right)^2 \approx (PLF) * 1 * 1 * \left(\frac{\lambda}{4\pi R}\right)^2$ This AICR calculated for transportation vehicle VA can be send to the following transportation vehicle VB which is driving along the same path reaching the same or a similar position later. Transportation vehicle VB makes use of the AICR for predicting the channel properties and can make signal transmissions with the appropriate transmission parameters such as transmission power, modulation scheme, throughput, error correction code, DeModulation Reference Signals (DMRS) for Doppler spread compensation, etc. By reviving the antenna gain from the base station 210 and the $\Gamma_{AICR}$ either the transportation vehicle VB is able to predict its future channel transfer function or the base station 210 can predict it and inform the transportation vehicle. The base station 210 will measure the channel transfer function $\Gamma$. According to the formula presented above, the channel transfer function $\Gamma$ will be measured at base station 210. It corresponds to the ratio between the transmit power at the transportation vehicle and the receive power at base station 210. The transmit power is indicated in the message sent from transportation vehicle to base station and thus the values can be derived at the base station. For getting the AICR the calculation according to the formula for $\Gamma_{AICR}$ will be performed and transmitted to car VB where it will be used for optimizing the transmission parameters for its own transmissions such that the channel quality requirements such as latency can be met.

A very suitable use case for this solution corresponds to a cooperative driving maneuver called "platooning." Platooning refers to the intelligent convoy driving as an application, which is also known as "high density platooning." The distances d between the transportation vehicles of the convoy, e.g., trucks are adapted to the traffic situation and controlled. The aim is to reduce the distance d between the convoy transportation vehicles as much as possible to reduce energy consumption. For this purpose, messages must be constantly exchanged between the convoy transportation vehicles. In one form of realization of a platoon, there is one transportation vehicle which is coordinating the cooperative driving maneuver. It is the transportation vehicle at the front of the platoon, which is called the platoon leader. The transportation vehicles in the platoon drive with equal distance and it is therefore easy to predict at what time a succeeding transportation vehicle will reach the position of the leading transportation vehicle.

It is to be understood that the proposed method and apparatus may be implemented in various forms of hardware, software, firmware, special purpose processors, or a combination thereof. Special purpose processors may include Application Specific Integrated Circuits (ASICs), Reduced Instruction Set Computers (RISCs) and/or Field Programmable Gate Arrays (FPGAs). Optionally, the proposed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more Central Processing Units (CPU), a Random Access Memory (RAM), and Input/Output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

REFERENCE SIGN LIST

10 Transportation vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 $1^{st}$ Data Bus
102 $2^{nd}$ Data Bus
104 $3^{rd}$ Data Bus
106 $4^{th}$ Data Bus
110 Multifunction Display
120 Telephone
130 Navigation System
140 Radio
150 Camera
160 On-Board Communication Unit
172 Engine Control Unit
174 ESC Control Unit
176 Transmission Control Unit
182 Adaptive Cruise Control Unit
184 Automatic Driving Control Unit
186 LIDAR Sensor
190 On-Board Diagnosis Interface
200 Evolved Packet Core
210 Base Station
300 Internet
310 Road Side Unit
320 Backend Server
VA $1^{st}$ Transportation Vehicle
VB $2^{nd}$ Transportation Vehicle
VC $3^{rd}$ Transportation Vehicle
B1 $1^{st}$ Building
B2 $2^{nd}$ Building
B3 $3^{rd}$ Building
h1 $1^{st}$ Path Length
h2 $2^{nd}$ Path Length
h3 $3^{rd}$ Path Length

The invention claimed is:

1. A mobile station comprising:
a wireless communication module for transmitting messages to a partner station, wherein the wireless communication module transmits a Shared Radiation Pattern Message (SRPM) to the partner station, the SRPM including an antenna radiation pattern of the mobile station and a geographical position of the mobile station, wherein the partner station comprises a processing unit that calculates an Antenna radiation pattern Independent Channel Representation (AICR) configured to be communicated from the partner station to a second or third mobile station, wherein the calculation of the AICR is executed with
information regarding spherical coordinates of an antenna of the partner station, an antenna of the mobile station and an antenna of one of the second mobile station and the third mobile station,
information regarding the antenna radiation pattern of the mobile station, an antenna radiation pattern of one of the second mobile station and the third mobile station and an antenna radiation pattern of the partner station, and
information regarding at least one of a measured transfer function for communication between the mobile station and the partner station measured at the partner station, and a measured transfer function for communication between the mobile station and one of the second mobile station measured at the second mobile station and the third mobile station measured at the third mobile station, wherein the calculation of the AICR is executed without information regarding a geometrical profile of the mobile station, a geometrical profile of the second mobile station, a geometrical profile of the third mobile station, and a geometrical profile of the partner station, and wherein the communication module transmits the AICR to at least one of the second mobile station and the third mobile station.

2. The mobile station of claim 1, wherein the wireless communication module transmits a message to the partner station with a channel quality prediction based on the received AICR.

3. The mobile station of claim 1, wherein the mobile station and the partner station are a transportation vehicles equipped with the wireless communication module, and wherein the SRPM further includes information about a velocity and a direction of travel of the transportation vehicles.

4. A base station for a cellular mobile communication system, the base station comprising:
a communication transceiver for transmitting messages to a mobile station and receiving communication, the communication transceiver configured to transmit and receive a Shared Radiation Pattern Message (SRPM), the SRPM including an antenna radiation pattern of a first mobile station and a geographical position of the first mobile station; and
a processing unit that calculates an Antenna radiation pattern Independent Channel Representation (AICR) for communication between the first mobile station and the base station,
wherein the calculation of the AICR is executed with
information regarding spherical coordinates of an antenna of the first mobile station and an antenna of a second mobile station,
information regarding an antenna radiation pattern of the first mobile station and an antenna radiation pattern of the second mobile station, and
information regarding at least one of a measured transfer function for communication between the first mobile station and the second mobile station measured at the second mobile station and a measured transfer function for communication between the first mobile station and the second mobile station measured at the second mobile station, wherein the calculation of the AICR is executed without information regarding a geometrical profile of the first mobile station, a geometrical profile of the second mobile station, and a geometrical profile of the base station, wherein the communication transceiver transmits the AICR to the second mobile station.

5. A method for performing a wireless communication, based on an antenna radiation pattern of a first mobile station, the wireless communication being between a second mobile station and a partner station, the method comprising:
transmitting a Shared Radiation Pattern Message (SRPM) to the partner station, the SRPM including an antenna radiation pattern of the first mobile station to the partner station and a geographical position of the first mobile station;
calculating, in the partner station, an Antenna radiation pattern Independent Channel Representation (AICR) for communication between the first mobile station and the partner station;
wherein the calculation of the AICR is executed with
information regarding spherical coordinates of an antenna of the partner station, an antenna of the mobile station and an antenna of the second mobile station,
information regarding an antenna radiation pattern of the mobile station, an antenna radiation pattern of the second mobile station and an antenna radiation pattern of the partner station, and
information regarding at least one of a measured transfer function for communication between the first mobile station and the partner station measured at the partner station, and a measured transfer function for communication between the first mobile station and the second mobile station measured at the second mobile station, and wherein the calculation of the AICR being executed without information regarding a geometrical profile of the first mobile station, a geometrical profile of the second mobile station, and a geometrical profile of the partner station;
transmitting the AICR to the second mobile station; and
performing the communication between the second mobile station and the partner station based on the AICR between the first mobile station and the partner station,
wherein the calculating in the partner station the AICR for the communication between the second mobile station and the partner station includes multiplying an inverse of the received antenna radiation pattern from the first mobile station with a measured transfer function of a communication channel for the communication between the mobile station and the partner station.

6. The method of claim 5, wherein the first mobile station and second mobile station are each transportation vehicles equipped with a communication module moving on a road, place or ground, wherein the communication modules perform the wireless communication, and wherein the position of the second mobile station at the time when performing the communication between the second mobile station and the partner station corresponds to the position at the time when the first mobile station was transmitting the antenna radiation pattern to the partner station.

7. The method of claim 5, wherein the communication module is adapted for a communication according to a cellular mobile communication system and the partner station is a base station of the cellular mobile communication system.

8. The method of claim 5, wherein the first mobile station transmits the antenna radiation pattern in a Shared Radiation Pattern Message (SRPM) wherein the SRPM message further includes information about a velocity and a direction of travel of the transportation vehicle, and an AICR for the communication between the second or third mobile station and the partner station.

9. A method for performing a wireless communication between a third mobile station and a partner station, the method comprising:

transmitting a Shared Radiation Pattern Message (SRPM) to the partner station, the SRPM including an antenna radiation pattern of a first mobile station to the partner station and a geographical position of the first mobile station;

calculating, in the partner station, an Antenna radiation pattern Independent Channel Representation (AICR) for communication between the first mobile station and the partner station, wherein the calculation of the AICR is executed with information regarding spherical coordinates of an antenna of the partner station, an antenna of a mobile station and an antenna of a second mobile station, information regarding an antenna radiation pattern of the mobile station, an antenna radiation pattern of the second mobile station and an antenna radiation pattern of the partner station, and information regarding at least one of a measured transfer function for communication between the third mobile station and the partner station measured at the partner station and a measured transfer function for communication between the first mobile station and the second mobile station measured at the second mobile station, and wherein the calculation of the AICR is executed without information regarding a geometrical profile of the first mobile station, a geometrical profile of a second mobile station, a geometrical profile of the third mobile station, and a geometrical profile of the partner station;

transmitting the AICR to the third mobile station and performing the communication between the third mobile station and the partner station based on the AICR between the first mobile station and the partner station.

10. The method of claim 9, wherein the first and third mobile station and the partner station are transportation vehicles equipped with wireless communication modules moving on a road, place or ground, wherein the communication module is adapted for a wireless communication according to a V2V or V2X communication system, and wherein a geographical position of the third mobile station at a time when performing communication between the third mobile station and the partner station corresponds to a geographical position of the partner station at a time when the first mobile station had previously transmitted the (SRPM) to the partner station.

11. The method of claim 9, wherein the first mobile station transmits the antenna radiation pattern in a shared radiation pattern message (SRPM) wherein the SRPM message further includes information about a velocity and a direction of travel of the transportation vehicle, and an AICR for the communication between the second or third mobile station and the partner station.

12. The method of claim 9, wherein the calculating in the partner station the AICR for the communication between the second or third mobile station and the partner station includes multiplying an inverse of the received antenna radiation pattern from the first mobile station with a measured transfer function of a communication channel for the communication between the mobile station and the partner station.

* * * * *